(No Model.) 3 Sheets—Sheet 1.

J. K. JOHNSTON.
FLOUR CHUTE.

No. 502,194. Patented July 25, 1893.

Witnesses,
J. A. Saul.
Robt. Emmett.

Inventor,
John Kerr Johnston
by James L. Norris
Atty.

(No Model.) 3 Sheets—Sheet 2.

J. K. JOHNSTON.
FLOUR CHUTE.

No. 502,194. Patented July 25, 1893.

Witnesses
J. A. Saul
Robert Barratt

Inventor
John Kerr Johnston
by James L. Norris
Atty

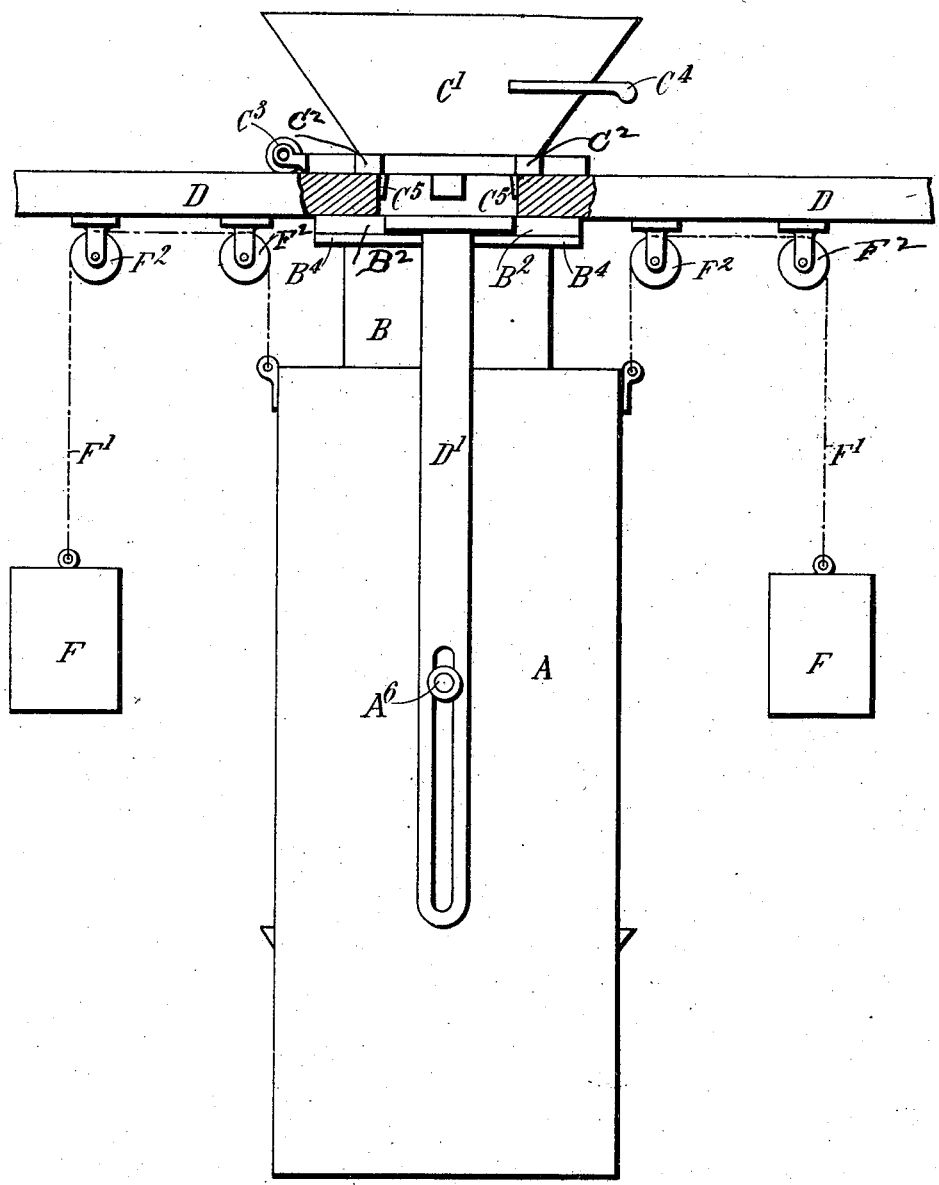

UNITED STATES PATENT OFFICE.

JOHN KERR JOHNSTON, OF DUNDRUM, IRELAND.

FLOUR-CHUTE.

SPECIFICATION forming part of Letters Patent No. 502,194, dated July 25, 1893.

Application filed March 2, 1893. Serial No. 464,428. (No model.)

*To all whom it may concern:*

Be it known that I, JOHN KERR JOHNSTON, miller and baker, a subject of the Queen of Great Britain, and a resident of Churchtown Park, Dundrum, in the county of Dublin, Ireland, have invented certain new and useful Improvements in and Relating to Chutes for Flour, Grain, and the Like, of which the following is a specification, reference being had to the accompanying drawings.

My invention relates to chutes for granular or pulverulent material and has for its chief object to provide flour and grain chutes and appurtenances for the same which can be withdrawn or raised. This is desirable when it is required to raise the chute clear of the machines for example in which the flour, grain, or the like is to be treated after being delivered thereinto by the chute.

In carrying out my invention I provide a telescopic chute, that is to say, a chute made in two parts one of which can be moved axially relatively to the other by any suitable mechanical means so as to shorten or lengthen the chute. Such chutes are very convenient, as when not in use they may be drawn up and thus kept clear of the machinery which may be in the room below. I also provide a movable hopper for use on the floor above the chute and through which the grain or the like is supplied thereto.

Figure 1:
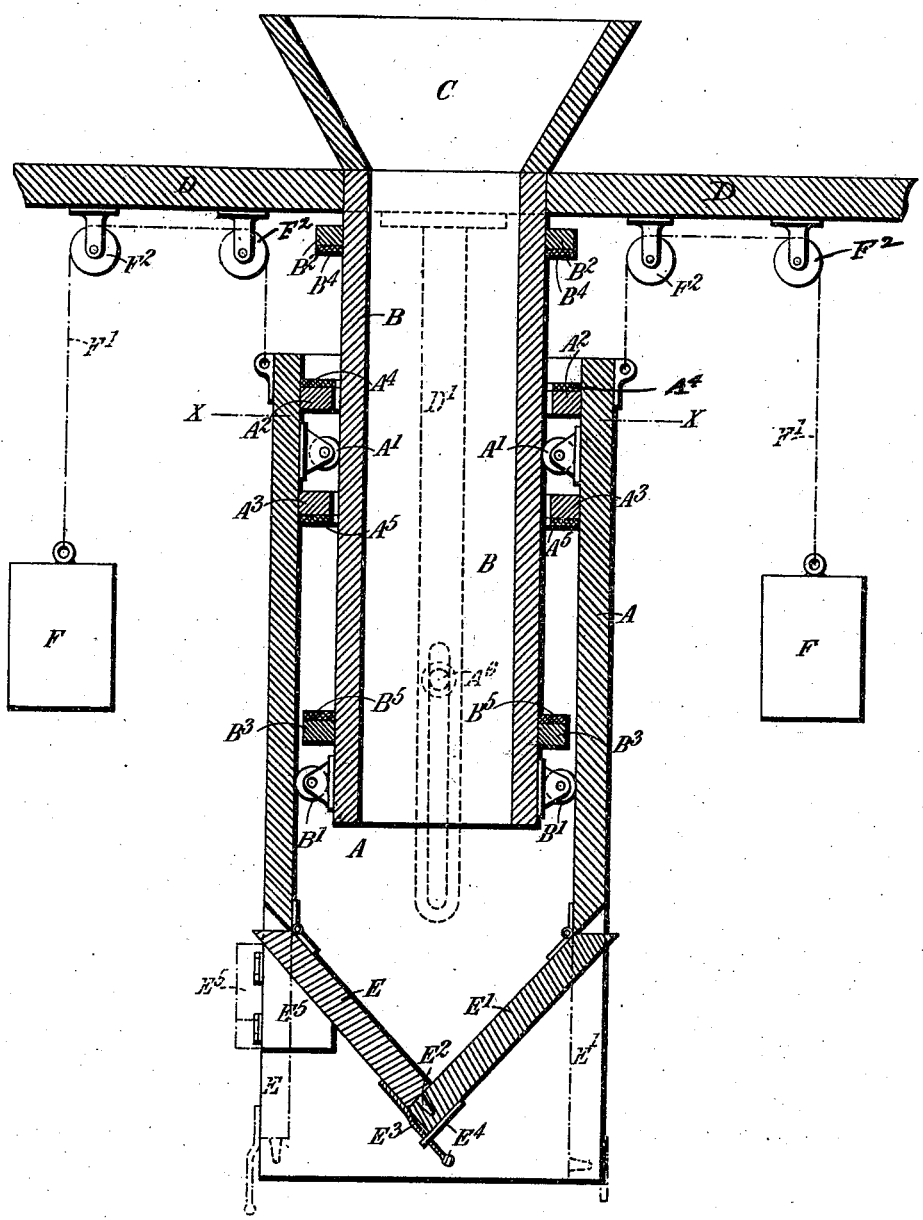
Figure 2:
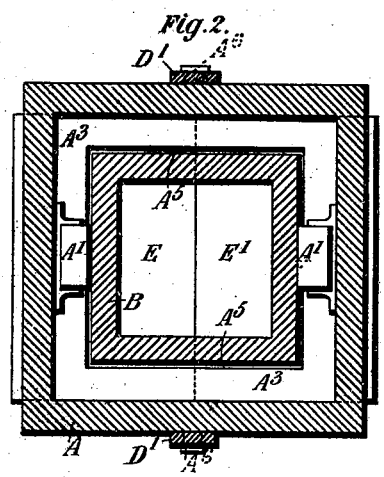
Figure 3:
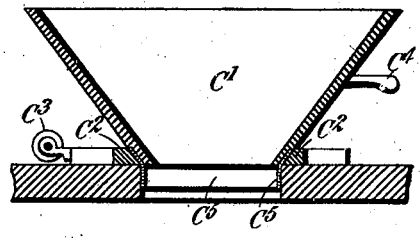
Figure 4:
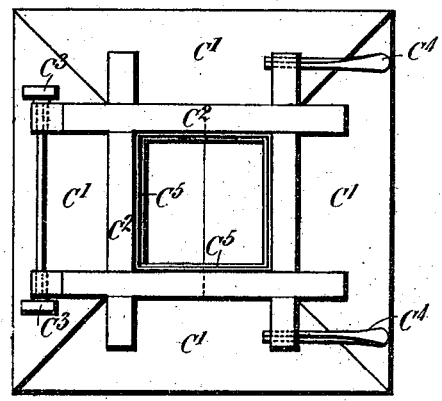

In the accompanying drawings, Figure 1 is a sectional elevation of a telescopic chute constructed according to my invention. Fig. 2 is a section on the line $x, x$ Fig. 1. Fig. 3 is a sectional elevation and Fig. 4 a view from below of a removable hopper which I prefer to use with the chute shown in Fig. 1. Fig. 5 is an elevation partly in section of a telescopic chute such as shown in Fig. 1 combined with a movable hopper such as shown in Figs. 3 and 4.

Similar letters of reference denote similar parts in all the drawings.

Referring now to Figs. 1 and 2, A is the movable part of the chute which is adapted to slide on the fixed part B of the same.

D is the floor of the chamber from which the flour, grain, or the like is to be conveyed.

C is the hopper; E E' the doors for closing the mouth of the chute; and F, F are counterweights which balance the movable part of the chute.

The fixed and movable parts of the chute are both provided with guide rollers $A', A', B', B'$, to render the motion of the sliding part A more easy, and with the same object the said sliding part is counterbalanced by the weights F, F, attached to the cords $F', F'$, passing over pulleys $F^2, F^2$.

In order to prevent the movable part of the chute from being pushed up too far or from descending too low and thus becoming disconnected with the fixed part I preferably provide ledges $A^2, A^2$, secured inside the upper end of the said movable part, which ledges are adapted to come in contact with similar ledges $B^2$ when the said movable part is drawn up as far as desirable. Ledges $A^3, A^3$, are also provided on the movable part to limit its downward travel by engaging with ledges $B^3, B^3$, secured to the bottom of the fixed part. These ledges are moreover useful for preventing the escape of dust and fine particles between the sides of the two parts of the shaft when in use, and for the better accomplishment of this purpose I sometimes cover the interior faces $A^4, A^5, B^4, B^5$, of the said ledges with cloth, india rubber or similar material so as to form a dust tight joint when the chute is extended or shortened to the limit. I may for a similar purpose line the internal parts of the ledges $A^2, A^3$, and the external sides of the ledges $B^2, B^3$, with felt or the like so as to fill the space between the said ledges and the sides of the fixed or movable part of the chute.

In order to prevent the weight of any flour, grain or the like which may be contained in the chute when the doors E, E', are closed straining the ledges $A^3$, or stops $B^3$ injuriously I prefer to arrange that the weight shall be borne by a stud $A^6$ shown by dotted lines, Fig. 1 and secured to the outside of the movable part A, which stud works in a slot in an arm D' also shown by dotted lines and suspended from the floor D.

In Figs. 1 and 2 I have shown my improved chute fitted with a valve or doors in the bottom thereof although such valve is not always required. The valve which I prefer to use has two doors E, E', hinged to two opposite sides of the chute respectively. These sides are preferably shorter than the other pair of sides by an amount equal to the length of one of the doors. Hence when the doors are open as shown in dotted lines in Fig. 1 all the sides of the chute are the same length. The doors are arranged to be folded in toward each other as shown in full lines in the said figure till their lower edges meet. The doors are secured in this position by pins $E^2$ projecting from the door E and adapted to engage in holes provided in the other door E' and also by a spring catch or hasp $E^3$ secured on the door E and adapted to engage on a pin $E^4$ projecting from the door E'. By these means the doors can be very firmly closed. This construction also admits of very readily opening and closing the said doors.

$E^5$, $E^5$ are other doors with sloping top sides hinged to the long sides of the chute which may be opened to various angles so as to keep either the doors E, E', closed, or one only partially opened independently of the other regulating the rush of grain or the like down the chute. When the chute is nearly empty the door or doors can be opened to the full.

In Figs. 3 and 4 I have shown a movable hopper which I prefer to use with my improved chute instead of employing a fixed hopper as shown at C Fig. 1. And in Fig. 5 a movable hopper is shown in combination with one of my telescopic chutes. The said hopper is made with four sloping sides C' fixed to a frame $C^2$ which sides are adapted to rest on the floor over the hole at the top of the chute. I provide moreover two wheels $C^3$, $C^3$, pivoted on the frame $C^2$ by means of which the hopper may be trundled from place to place when tilted forward by the handles $C^4$, $C^4$. When the hopper is stationary the wheels are off the ground so that it can not easily be moved and in order to still further guard against the accidental shifting of the same when in use I provide stops, ledges, or projections $C^5$, $C^5$, on the bottom thereof which engage with the sides of the hole in the floor and effectually prevent any movement of the hopper. These ledges or projections moreover convey the grain or the like better over the joints between hopper and chute.

My improved chutes and appurtenances are very suitable for conveying various materials such as flour, grain, and the like. They may also be used for delivering liquids. They may be used in bakeries for conveying flour and dough to the machines, and may be conveniently employed for various other purposes.

What I claim is—

1. A telescopic chute, consisting of a stationary and a movable tubular part having guide rollers and co-acting ledges mounted on the stationary and movable tubular parts and operating to prevent the escape of dust, and also to limit the movement of the movable tubular part relatively to the stationary part, substantially as described.

2. A chute for grain and the like comprising the combination with a tubular fixed part, of a movable tubular part one pair of opposite sides of which is shorter than the other pair, and adapted to slide on the said fixed part, rollers secured to the said parts, ledges secured to the said parts and adapted to limit the travel of the said movable part and to prevent dust escaping from between the said parts, a valve consisting of two doors hinged to the lower edges of the two short sides of the movable part of the chute, and means for maintaining said valve tightly closed, substantially as described.

3. A chute for grain and the like comprising the combination with a tubular fixed part, of a movable tubular part one pair of opposite sides of which is shorter than the other pair, and adapted to slide on the said fixed part, stops secured to the said parts and adapted to limit the travel of the said movable part, a valve consisting of two doors hinged to the short sides of the movable part of the chute, and brackets hinged to the long sides of the movable part adapted to hold one of the said doors at any desired height and thus maintain the valve partly open, substantially as described.

4. The combination with a telescopic chute, consisting of a stationary and a movable tubular part having guide rollers, and coacting ledges mounted on the stationary and movable tubular parts, of a detachable hopper adapted to be moved away from said chute when required, substantially as described.

In witness whereof I have hereunto set my hand this 11th day of February, 1893.

JOHN KERR JOHNSTON.

Witnesses:
  WM. KERR JOHNSTON,
    *Solr., Dublin.*
  EDWD. D. BENTLEY,
    *5 Foster Place, Dublin, Solrs. Asst.*